UNITED STATES PATENT OFFICE.

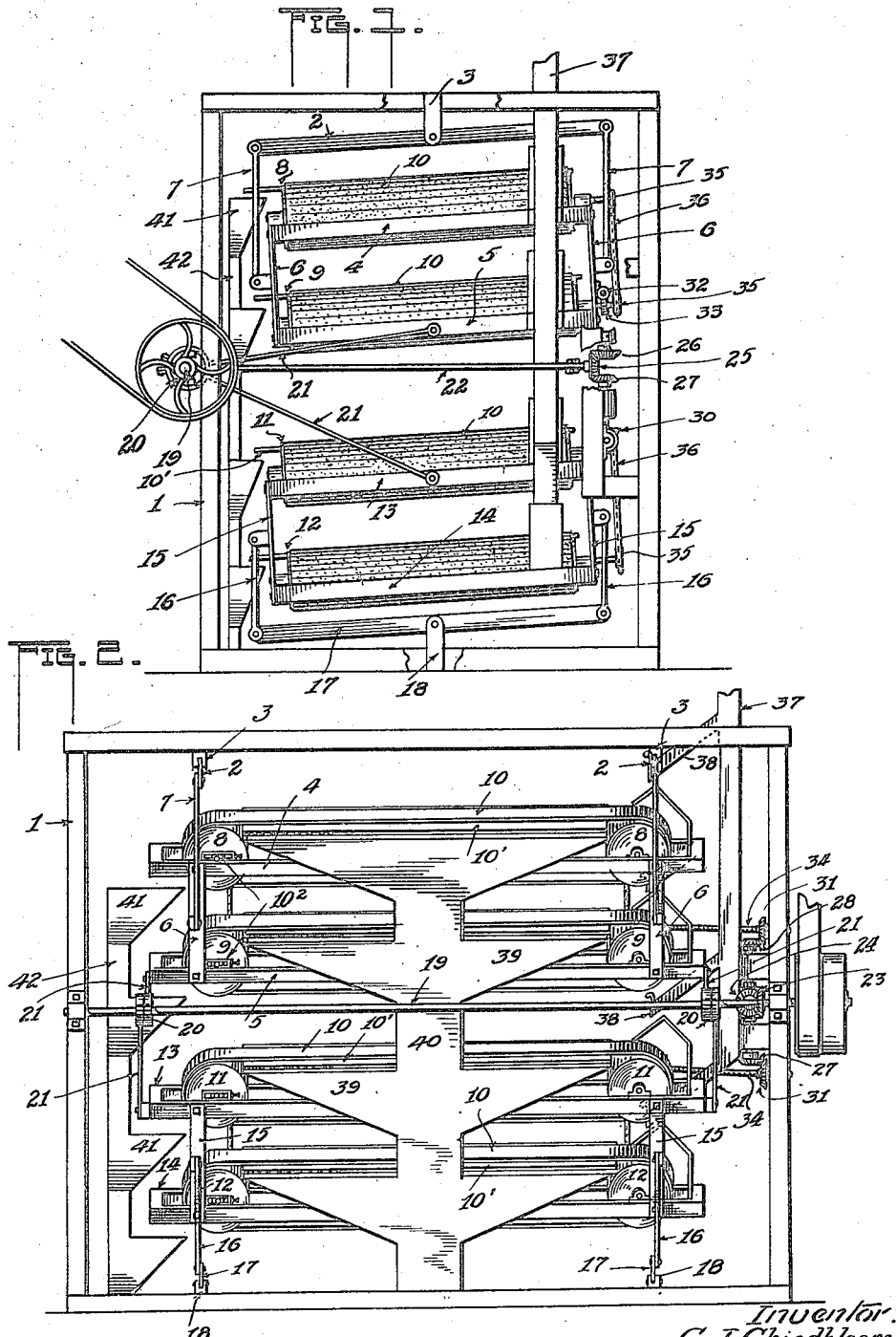

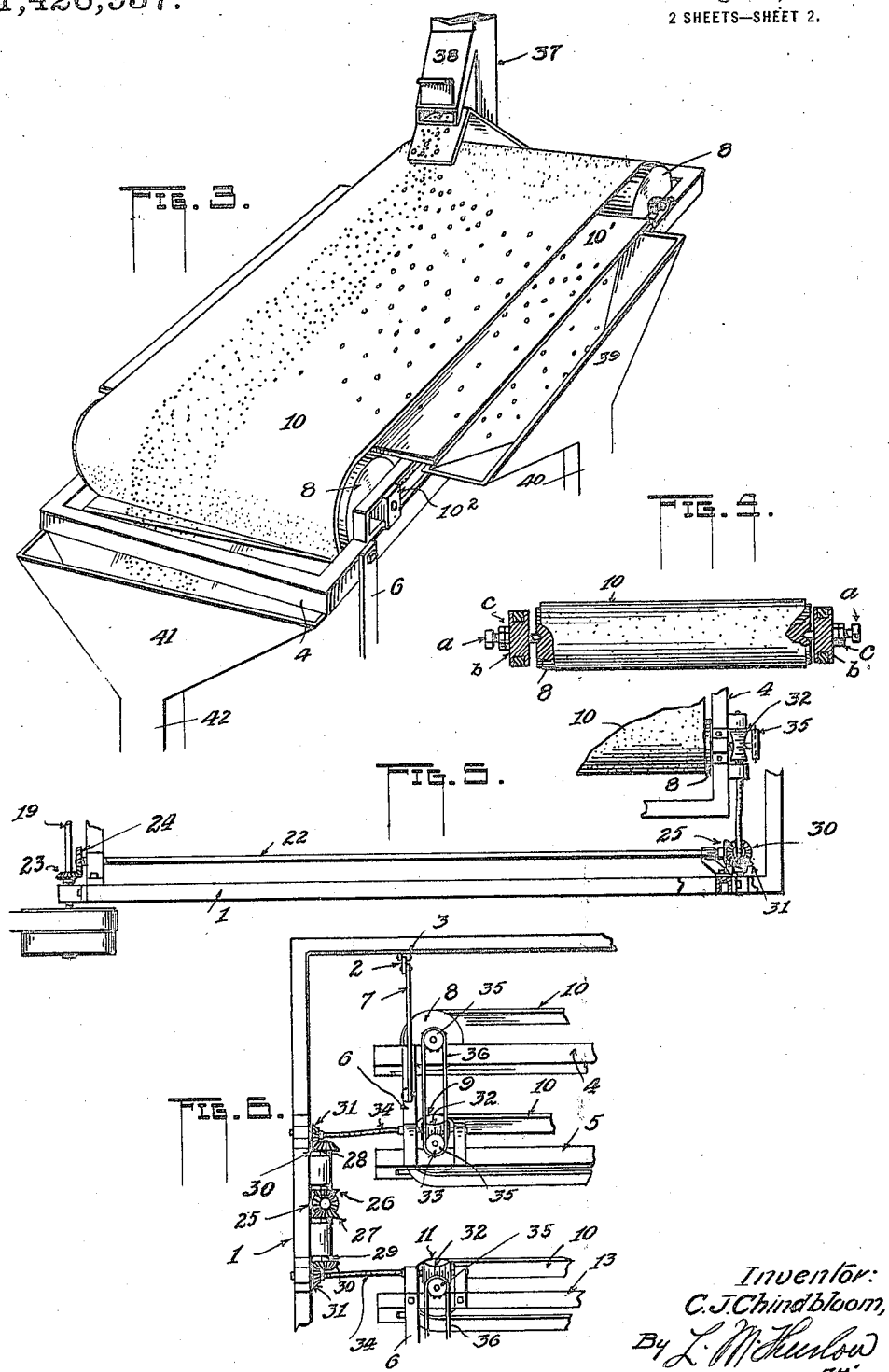

CARL J. CHINDBLOOM, OF PEORIA, ILLINOIS, ASSIGNOR TO AMERICAN MILLING CO., OF PEORIA, ILLINOIS, A CORPORATION OF NEW JERSEY.

APPARATUS FOR SEPARATING SEEDS.

1,426,957.        Specification of Letters Patent.    Patented Aug. 22, 1922.

Application filed October 13, 1919. Serial No. 330,457.

*To all whom it may concern:*

Be it known that I, CARL J. CHINDBLOOM, citizen of the United States, residing at Peoria, in the county of Peoria and State of Illinois, have invented certain new and useful Improvements in Apparatus for Separating Seeds; and I do hereby declare that the following is a full, clear, and exact description of the invention, which will enable others skilled in the art to which it appertains to make and use the same.

This invention pertains to an apparatus for the separation of dissimilar seeds, or the separation of seeds of certain kinds from those of a different nature.

More particularly the invention relates to a method of and an apparatus for separating flax seed from cracked wheat.

The object of my invention is to provide a new manner of separating dissimilar seeds, utilizing means of a peculiar nature by which this separation may be effectively accomplished. Certain kinds of seeds, because of their form and nature, are difficult to separate from others and special machinery and appliances are required for this purpose.

The separation of flax seed from cracked wheat is an exceedingly difficult operation, many attempts having been made in the past to accomplish such separation, but with little or no success from a practical standpoint.

I have found that a material presenting a peculiarly roughened surface, when inclined at a certain angle and vibrated in the direction of inclination, tends to hold or retard the movement of the cracked wheat seed down the incline, while permitting the flax seed to move down such incline in a fairly free manner.

To the end that my invention may be understood, the accompanying drawings have been provided, showing one manner of constructing an apparatus for carrying out my method of separation of seeds, it being understood that such apparatus is susceptible of changes, that shown being merely one embodiment and illustrates the manner of accomplishing the desired object.

Figure 1 is an end elevation of the apparatus.

Figure 2 is a front elevation of the same.

Figure 3 shows in perspective part of the apparatus shown in the earlier figures.

Figure 4 shows the manner of supporting a roller.

Figure 5 is a plan of part of what is shown in Figures 1 and 2 and,

Figure 6 is a rear elevation of part of the apparatus. My form of device has been found in practice to yield results not heretofore possible. It includes an endless traveling belt whose surface is roughened by affixing thereto sand, emery, corrundum or other sharp particles of a certain size or grade.

This endless belt is mounted so as to have progressive movement in the direction of its length and is inclined or tilted at an angle laterally, a slow progressive movement being imparted thereto, while at the same time vibrating or oscillating the belt in a lateral direction or at right angles to the direction of its progressive movement, the seed being fed thereonto at or near its highest point or upper edge at one end.

In the drawings 1 is indicative of a suitable supporting framing. 2, 2 indicate a pair of arms suspended at their middles from the top portion of the frame, being adjustable in certain supporting hangers 3 as will be described presently. 4 and 5 indicate two frames beneath the arms 2, being connected in spaced relation by tie members 6, said frames as a whole being suspended from the described arms 2 by means of links 7 which have pivotal relations at their ends with said arms and said tie members.

Journaled in spaced relation upon each frame for 4, 5 is a pair of rollers 8, 9 upon which is trained a belt 10 of suitable material having on its outer surface a covering or coating of sharp particles in the nature of sand, emery or like material giving a roughened friction surface or "tooth" thereto after the manner of coarse sand paper, corundum, garnet cloth, emery cloth, or emery for example.

11 and 12 are similar rollers mounted in frames 13 and 14 respectively corresponding to the frames 4 and 5. These said frames 13 and 14 are likewise held in spaced relation by tie members 15 to which are pivoted the ends of a series of links 16 whose other ends are pivotally connected to arms 17, which like the mentioned arms 2, are pivoted at their middles to members 18 at the bottom of the frame 1.

In making use of my invention the multiplication of the number of belts 10 as herein shown is merely in the interest of providing greater capacity for seed separation or so that large quantities can be quickly handled and I prefer to mount the frames 4, 5, 13 and 14 in pairs substantially as shown.

The hangers 3, and the members 18, at the bottom of the apparatus corresponding thereto, are in the nature of clamps which may be tightened to hold the arms 2 and 17 in any desired adjustment. Any desired inclination or tilt may be imparted to the belts through the said arms so that one edge may be maintained lower than the other, and they may be secured at the desired inclination by tightening the clamps or by the use of any other means for the purpose, it being understood that the arrangement of the parts may be such that there will be no interference with the proper action of the pitman 21, but that the vibrations will be imparted to the frame in any position thereof. When thus adjusted, the described links permit the frames to have a lateral vibratory motion without changing such angle of inclination. This vibratory motion is obtained through a power shaft 19, journaled on the frame 1, there being an eccentric 20 thereon, for example, for each set of frames, a pitman 21 engaging each eccentric and having attachment to some part of the swinging structure as shown.

In addition to the vibratory lateral motion of the belts 10, a steady advancement thereof is imparted by any suitable driving gearing. As an example of the manner of imparting this movement, certain mechanism is shown in figures 2, 5 and 6. 22 is a shaft journaled on the frame 1 at right angles to the shaft 19, the latter and said shaft 22 having meshing beveled gears 23 and 24 respectively.

At its opposite end the shaft 22 is provided with a beveled gear 25 with which meshes a pair of gears 26, 27 separately carried by vertical shafts 28, 29 respectively. The opposite ends of the shafts are provided with gears 30 in mesh with gears 31 each journaled on a part of the frame substantially opposite the rollers 9 and 11.

Journalled on each of the frames 5 and 13 is a worm 32, each of which meshes with a worm-wheel 33 on the shaft of said rollers 9 and 11. A flexible shaft 34 connects the shaft of each wheel 31 with one of the worm shafts, the whole arrangement being such as to impart a progressive movement to the belts 10 of the described rollers. Rotation is imparted to the companion rollers through sprocket wheels 35 as the shafts of the rollers and chain 36 or by any other desired means.

From the fact that the belts are tiltable as described and further, that they have a lateral vibratory motion the driving means for advancing them must be of a more or less flexible nature or such that said means will accommodate itself to the movements mentioned; and although the form of gearing described including the flexible shafts is made use of, it is to be fully understood that other ways of steadily advancing said belts may be used.

The belts are kept under proper tension by the use of a tightening means at $10^2$ but this is well known to those familiar with machine structures.

Figure 4 illustrates one manner of mounting the rollers whereby to prevent end shake which if permitted, would tend to interfere with the separating operation. This consists of set screws $a$, for example carried by suitable supports $b$ on the frame and having pointed ends to seat in conical sockets in the ends of the roller. The screws are suitably held by means of lock nuts C, but other methods may be employed, for preventing such shake.

It is observed that all of the belts 10 preferably move in the same direction, the gearing being so arranged that this will result.

37 is a spout at one end of the apparatus having a chute 38 to overhang each of the belts near its edge having the highest elevation, Figures 2 and 3, for delivery upon said belts of the seed to be treated.

Beneath the upper stretch of each belt is a platform 10' provided to support the belt and for the purpose of conveying the separated seed to hoppers 39 leading into a common spout 40, Figures 1 and 2.

Below the discharge ends of the belts also, are hoppers 41 to receive the material from which the seed has been separated, said hoppers leading into a common spout 42, Figure 2.

The manner of operation is as follows: The rotation of the shaft 19 sets up a vibratory motion of the roller-carrying frames whereby the tilted belts will have the desired lateral motion while the rotation of the shaft 22 imparts a progressive movement to the said belts. This movement or travel of the latter may be governed by the relative size of the meshing pinions, or by the pitch of the threads of the worm 32, or both, as will be understood. Such movement is a comparatively slow one so that the materials handled will be given ample time to undergo separation. The deposit of the material upon the highest portion of the inclined belt at one end is moved along toward the discharge end of that member and since the particles of cracked wheat are more or less angular, they will cling to the belt surface due to the sharp form of coating thereof during the vibrating or shaking motion, while the flax seed, which is substantially flat and smooth will slide upon the said coating and work laterally finally being discharged from the belt edge because of such vibrations.

In practice the separation of the seed is clear and sharp, the method being thoroughly practical.

The grade of material used as the coating for the belt, the angle of inclination of the latter, and the length and speed of vibration when properly related all act to produce the required result.

As has been stated, as far as the apparatus is concerned it may be constructed in different ways and the belts may be multiplied to any extent to increase the capacity for separation.

I claim.

1. A separator comprising an endless belt or apron, a roughened conveyer surface thereon comprising a coating of added granular material and a slope lateral to its direction of movement, means for moving said belt or apron, means to supply a mixture of seeds to be separated to the upper rearward portion of said belt or apron, and means to impart a lateral vibratory motion to said belt or apron during movement.

2. An apparatus of the class described including, in combination, a support, a tiltable member pivotally supported between its ends thereon capable of being fixed in position, a frame, a separating element mounted on said frame, means for operating said element and a link pivotally connected to each end of the tiltable member and each also pivoted at one end to said frame supporting the latter from said member.

3. An apparatus of the class described including, in combination, a support, a tiltable member pivotally supported between its ends thereon capable of being fixed in position, a frame, a separating element mounted on said frame, means for operating said element, a link pivotally connected to each end of the tiltable member and each also pivoted at one end to said frame supporting the latter from said member, and means to vibrate the frame with respect to said tiltable member.

4. A separator comprising a support, a tiltable member mounted on said support, a frame carrying a separation element mounted on said tiltable member, means to vibrate said frame in a direction transverse to movement of the separator element, and means to operate the said separator element during said vibration.

5. A separator comprising a tiltable support mounted between its ends and capable of being fixed in position at a desired angle, a link at each end of said member and pivoted thereto, a frame pivoted to and between said links, a seed receiving member carried by said frame tiltable through the instrumentality of said tiltable member and said links, and means to vibrate the frame in a direction of inclination of the seed receiving member.

In testimony whereof I affix my signature in presence of two witnesses.

CARL J. CHINDBLOOM.

Witnesses:
L. M. THURLOW,
W. G. ATWOOD.